US008781623B2

(12) United States Patent
Leech et al.

(10) Patent No.: US 8,781,623 B2
(45) Date of Patent: Jul. 15, 2014

(54) INTERACTIVE BULK PACKAGING SYSTEM

(75) Inventors: Nicholas A. Leech, Aloha, OR (US); Derek A. Fitchett, Beaverton, OR (US); Jung Gyu Moon, Ansan (KR)

(73) Assignee: Nike, Inc., Beaverton, OR (US)

( * ) Notice: Subject to any disclaimer, the term of this patent is extended or adjusted under 35 U.S.C. 154(b) by 233 days.

(21) Appl. No.: 13/405,674

(22) Filed: Feb. 27, 2012

(65) Prior Publication Data

US 2013/0226337 A1 Aug. 29, 2013

(51) Int. Cl.

| | |
|---|---|
| ***G06F 17/00*** | (2006.01) |
| ***A63B 47/00*** | (2006.01) |
| *G07F 11/44* | (2006.01) |

(52) U.S. Cl.

CPC ............... *A63B 47/002* (2013.01); *G07F 11/44* (2013.01)

USPC .......................................... 700/240; 700/235

(58) Field of Classification Search

CPC ..... G07F 11/44; G07F 17/32; A63B 37/0003; A63B 37/0031; A63B 37/0043; A63B 47/002

USPC .......................... 700/231, 235, 237, 240, 242

See application file for complete search history.

(56) References Cited

U.S. PATENT DOCUMENTS

| | | | | |
|---|---|---|---|---|
| 5,009,330 | A * | 4/1991 | Young et al. | 221/196 |
| 5,673,812 | A * | 10/1997 | Nelson | 221/82 |
| 5,685,435 | A * | 11/1997 | Picioccio et al. | 222/144.5 |
| 5,976,430 | A | 11/1999 | Kataoka et al. | |
| 6,371,330 | B1 * | 4/2002 | Knez | 221/200 |
| 7,451,015 | B2 * | 11/2008 | Mazur et al. | 700/239 |
| 2003/0148824 | A1 | 8/2003 | Wachi | |
| 2011/0009215 | A1 | 1/2011 | Ichikawa et al. | |
| 2012/0024731 | A1 | 2/2012 | Fitchett | |

FOREIGN PATENT DOCUMENTS

WO WO 2012018208 A2 * 2/2012

* cited by examiner

*Primary Examiner* — Timothy Waggoner

(74) *Attorney, Agent, or Firm* — Quinn Law Group, PLLC

(57) ABSTRACT

A system for dispensing a bulk product includes an interactive display. The system may be linked to another system which selects a variety of the bulk product and automatically causes the dispenser to dispense the selected variety. The dispensing system may also include a container associated with a remote carrier, so that the bulk product may be dispensed into the container in which the user wishes to store the bulk product long term.

11 Claims, 10 Drawing Sheets

INTERACTIVE BULK PACKAGING SYSTEM

BACKGROUND

The present invention relates generally to a system for selecting and distributing a bulk product. In particular, the present invention is a system that includes an interactive display associated with a bulk product dispenser, where the interactive display assists a user in selecting and dispensing the bulk product.

Many types of products are distributed in a retail setting as bulk products in bins. For example, many types of foods, such as nuts and candy, are stored in bins so that a shopper may purchase any desired quantity, as the bulk products are typically sold by weight. To facilitate the process, lightweight plastic bags are often provided by the retail location proximate the bins so that the shopper may dispense the bulk product into the bags. In other scenarios, reusable containers may also be used.

In certain sports and games, certain pieces of game equipment are consumed rapidly during play. For example, in games that use balls, the balls deteriorate or are lost during play much sooner than the other pieces of equipment. Common examples of this consumed equipment include golf balls, tennis balls, baseballs, softballs, among others. Replacements for this consumed equipment are sold separately in stores, often in set quantities and in packaging designed to catch a shopper's eye, advertise the product, and assist the shopper in selecting the product.

Purchasers everywhere are increasingly interested in so-called "green" packaging, i.e., environmentally-friendly packaging. Bulk packaging for consumer items appears to be a green way in which to reduce the resources consumed in getting the consumer items from the manufacturer to the consumer. However, bulk packaging does little to advertise the consumer item or differentiate between one type of consumer item and another, similar product.

Therefore, a need exists in the art to reduce packaging on bulk item consumer goods while still informing the consumer of the specifications and benefits of a particular consumer item.

SUMMARY

In one aspect, the invention provides a system for dispensing a hulk product with an interactive display. A user may interact with the display to determine whether or not to purchase the bulk product, the quantity to purchase, a particular type of bulk product to purchase, and to control the dispenser to dispense a desired quantity of the bulk product.

In one aspect, the system includes a hopper configured to contain the bulk product, an interactive display associated with the hopper, wherein the interactive display is configured to facilitate a selection of a quantity of the bulk product by a user, and wherein the hopper is configured to dispense the quantity of the bulk product to the user.

In one aspect, the system includes a dispenser configured to contain the bulk product, a display associated with the dispenser, an input device operatively associated with the display, a processor operatively associated with the display, the input device, and the dispenser, and a container removably associated with the dispenser, wherein the processor signals the dispenser to dispense the bulk product into the container.

In another aspect, the system includes a hopper configured to contain the golf balls, a base associated with the hopper, a dispensing opening disposed in the base, a conduit associating the hopper with the dispensing opening, a metered conveyor disposed in the conduit, wherein the metered conveyor separates the hopper from the dispensing opening, and an input/output device operatively associated with the metered conveyor, wherein the input/output device is configured to provide information to a user, wherein the input/output device is configured to receive an instruction from the user.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The embodiments presented in this description relate to an interactive system for dispensing bulk products. This system is appropriate for use with any type of bulk product, which for the purposes of this disclosure may be considered to be any item capable of being purchased in varying quantities. The items may be sold by weight, volume, or per piece. Examples of bulk products include but are not limited to liquids, powders, food, candy, spices, loose tea, coffee beans, toys, jewelry, and sporting equipment, such as balls. Throughout this description, golf balls are provided as the discussed example of a bulk product. However, "bulk product" is intended to encompass a much broader category of items.

Figure 1:
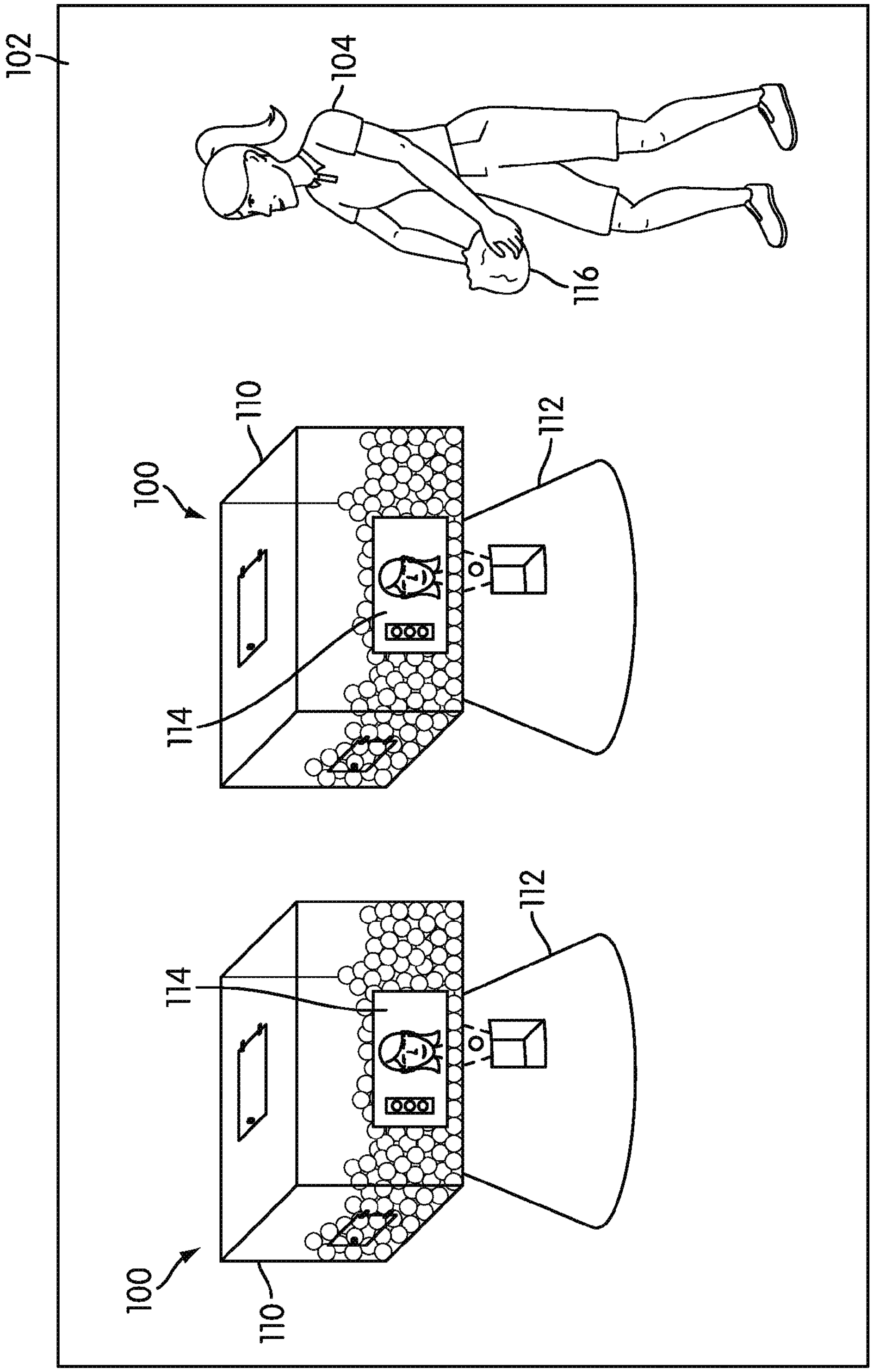
FIG. 1 is a drawing of an embodiment of an interactive system for dispensing a bulk product with a user approaching the system.

FIG. 1 is an embodiment of an interactive system 100 for dispensing a bulk product 108 shown in a retail location 102 with a user 104 approaching interactive system 100 with a container 116. Interactive system 100 generally includes a hopper 110 for holding the bulk product 108 prior to dispensing, an interactive display 114 associated with hopper 110, and, optionally, a base 112 for facilitating the dispensing of bulk product 108 from hopper 110 into container 116. In this embodiment, bulk product 108 is golf balls and user 104 is a golfer. However, in other embodiments, bulk product 108 may be any type of bulk product, and user 104 may be any person or entity.

Figure 2:
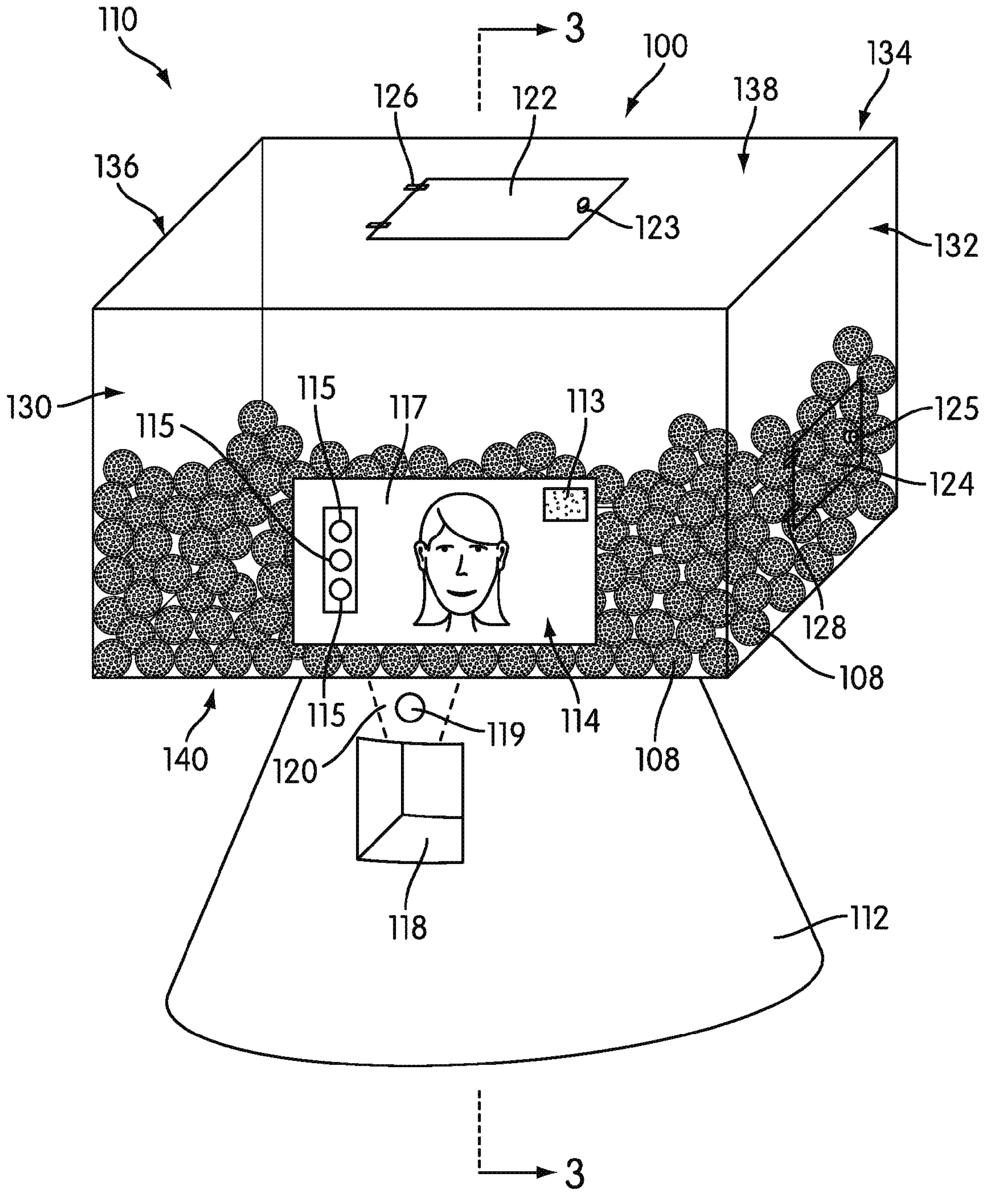
FIG. 2 is a perspective view of an embodiment of an interactive dispensing system.

Interactive system 100 is shown in greater detail in FIG. 2. Hopper 110 is shown in this embodiment as a transparent or semi-transparent box having a first side wall 130, a second side wall 132, a third side wall 134, a fourth side wall 136, a top wall 138, and a bottom wall 140. These side walls are associated with each other to generally form a cube, though in other embodiments hopper 110 may include any number of walls and have any shape, such as spherical, polyhedrons, or irregular shapes. The walls of hopper 110 are configured to define an internal space, void, or volume for holding bulk product 108. The internal volume of hopper 110 may be selected according to any number of design factors, including but not limited to the size of the individual items of bulk product 108, the number of items of bulk product 108 desired to be contained within hopper 110, the amount of unused volume or dead space desired to be provided within hopper 110, aesthetic considerations, and retail location/size considerations.

The transparency of hopper 110 serves as a first level of advertising of bulk product, so that user 104 (shown in FIG. 1) may be provided with a visual of the actual available product. However, in other embodiments, transparency of hopper 110 may not be desirable, such as if bulk product 108 were susceptible to degradation when exposed to certain frequencies of light, such as UV light. For example, golf balls often discolor or degrade at the surface of the golf ball when exposed to UV light, while candy may melt or foods lose freshness when exposed to UV light. Therefore, hopper 110 may include light filters to filter undesirable frequencies of light in order to protect bulk product 108, or hopper 110 may be substantially opaque.

Hopper 110 may be made from any type of material known in the art to have sufficient rigidity to maintain its shape over time. Examples of appropriate materials for hopper 110 include various types of plastics, metal, and composite materials. Hopper 110 may be formed using any type of manufacturing process, such as any type of molding, casting, and metalworking including machining, die cutting, and the like. In some embodiments, each side wall may be separately formed and then joined together to form the desired shape. The joining could be with an adhesive, welding, epoxy, joint compound, or the like. In some embodiments, hopper 110 may be formed to be air and water-tight so that bulk product 108 will not degrade when exposed to oxygen, humidity, pollutants, or other types of materials. In some embodiments, hopper 110 may be formed so that a vacuum may be established within hopper 110 to preserve bulk product 108. In other embodiments, hopper 110 may include a gas in addition to bulk product to preserve the freshness of bulk product. For example, golf balls may be placed inside hopper 110 and then the remaining space within hopper 110 may be filled with nitrogen in order to preserve the golf balls.

Hopper 110 may be provided with one or more ports to allow hopper 110 to be refilled with bulk product 108 and/or preservatives. In the embodiment shown in FIG. 2, hopper 110 is provided with two ports: a top port 122 which creates an entry through top wall 138 and a side port 124 which creates and entry into hopper 110 through second side wall 132. Top port 122 and side port 124 may be any type of entry known in the art, such as a sealed nozzle having a one-way valve for inputting liquids or gas, sliding drawers with multiple openings to allow for refilling without contaminating the bulk product within hopper 110, or any other type of port. In the embodiments shown in the figures, top port 122 and side port 124 are shown as doors, with portions of material covering a hole cut through or formed in top wall 138 and side wall 132. These portions of material may be sealed, such as with an elastomeric member, to prevent leakage of liquids or introduction of air or other unwanted materials.

The portions of material of ports 122, 124 may lift entirely away from top wall 138 and side wall 132, or, as shown, the portions of material may be hingedly attached to top wall 138 and side wall 132. Top port 122 may include a top hinge 126, while side port 124 may include a side hinge 128. Hinges 126, 128 may be any type of hinge known in the art, including but not limited to pivot hinges, barrel hinges, strap hinges, mortise hinges, and living hinges, among other types of hinges.

Additionally, top port 122 may include a top handle 123 and side port 124 may include a side handle 125 to facilitate manipulation of ports 122, 124. For example, in the embodiments shown in the figures, handles 123, 125 may be used to lift the portions of material away from top wall 138 and side wall 132, respectively. Handles 123, 125 may be any type of handle known in the art, ranging from simple knobs and pulls to interlocking mechanisms for securing the openings of ports 122, 124. In some embodiments, ports 122, 124 may be provided with a locking mechanism to prevent unauthorized access to hopper 110. The locking mechanism may be any type of locking mechanism known in the art, such as pin tumbler locks, wafer tumbler locks, lever locks, cam locks, electronic locks, padlocks, or the like.

Figure 3:
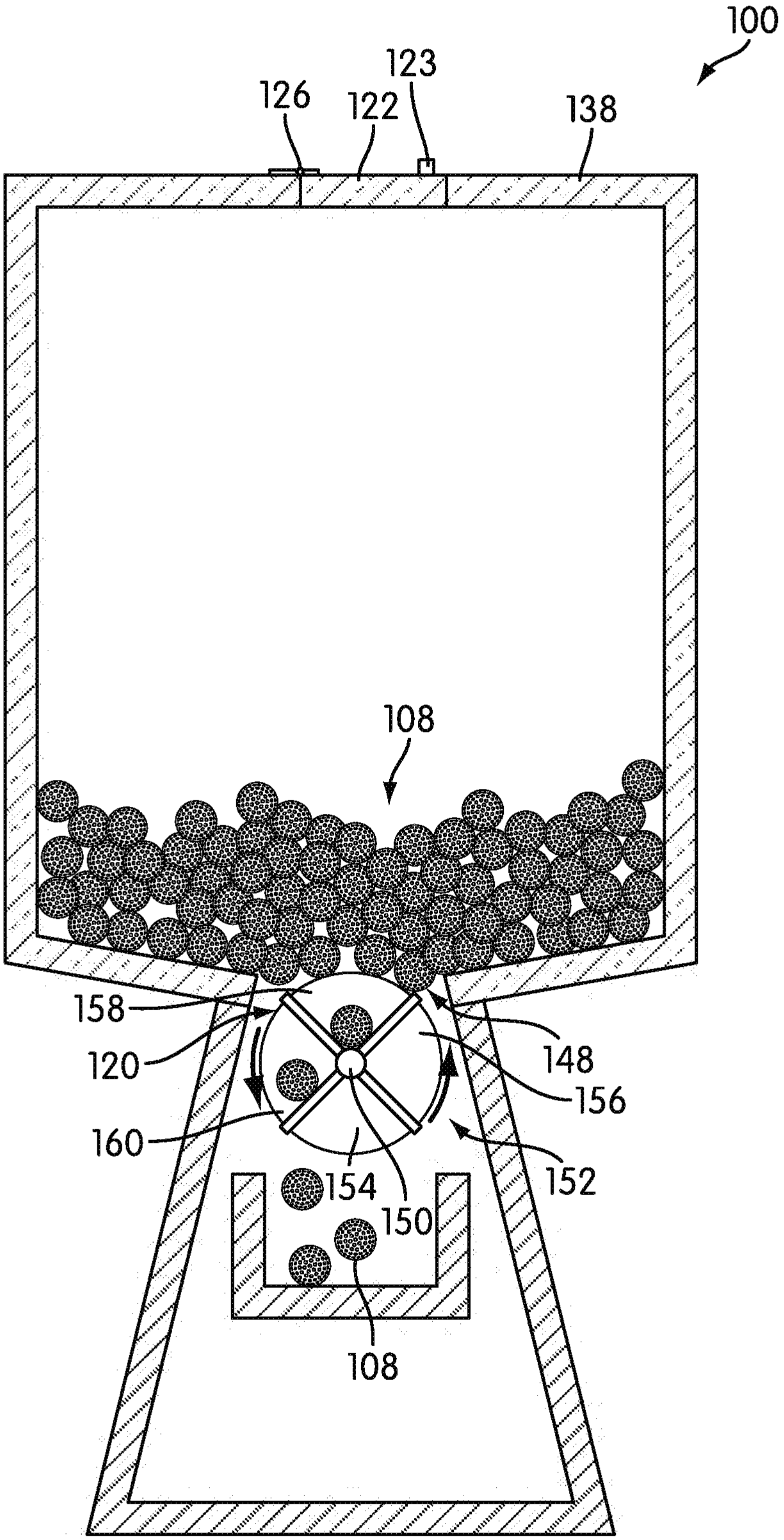
FIG. 3 is a cross-sectional view of the interactive dispensing system shown in FIG. 2.

Hopper 110 may include a dispensing portion separate from any port or ports which may be provided with hopper 110. One embodiment of the dispensing portion is shown in FIG. 3. The dispensing portion may be positioned proximate a bottom or lower portion of hopper 110 so that gravity may be used to assist in the dispensing of bulk product 108 from hopper 110. The dispensing portion may include an aperture 148 defined by a portion of bottom wall 140. As shown in FIG. 3, bottom wall 140 may be sloped so that a lowest portion of bottom wall 140 defines aperture 148. Such a configuration may assist in moving bulk product 108 toward aperture 148.

Aperture 148 may be any size or shape sufficient to allow a quantity of bulk product 108 to pass through aperture 148. Similar to ports 122, 124 described above, aperture 148 may include seals, nozzles, and valves to control the passage of bulk product 108 through aperture 148. In some embodiments, aperture 148 may simply be an opening in bottom wall 140.

Aperture 148 may define a boundary between the interior volume of hopper 110 and a conduit 120 which leads to a dispensing opening 118. In some embodiments, conduit 128 and dispensing opening 118 may be disposed in or associated with a base or stand 112 associated with hopper 110. Base 112 may be made from similar materials as hopper 110. Base 112 may have any shape or size. Base 112 may be fixedly attached to hopper 110, where a permanent connection between base 112 and hopper 110 is established. Examples of fixed attachments include adhering, welding, and the like. In other embodiments, base 112 may be removably associated with hopper 110, where a readily undone connection between base 112 and hopper 110 is established. Examples of removable attachments include mechanical connectors such as latches, interlocking threaded portions, screws, and the like.

In some embodiments, such as the embodiment shown in FIG. 3, dispensing opening 118 is associated with base 112. In some embodiments, dispensing opening 118 may be a chamber or platform formed in base 112. Dispensing opening 118 may be any size or shape. In some embodiments, dispensing opening 118 may be sized and shaped so that container 116 may be fully inserted into dispensing opening 118. In other embodiments, dispensing opening 118 may be sized and shaped so that a portion of container 116 may be inserted into dispensing opening 118. In some embodiments, container 116 may be securely fitted to dispensing opening 118 or a mechanism associated with dispensing opening 118, such as a nozzle, so that bulk product 108 may be passed from the dispensing mechanism into container 116 without the need for a user to hold container 116 in position or otherwise to maintain the position of container 116. In yet other embodiments, dispensing opening 118 may include trays, drawers, doors, pushing mechanisms, or any other configuration desirable to assist in dispensing bulk product 108 with minimal loss of bulk product 108, such as due to spillage.

It may be desirable in some embodiments to dispense bulk product 108 in particular, discrete quantities. In such embodiments, a metering mechanism 152 for measuring out the particular, discrete quantities of bulk product 108 may be provided. In some embodiments, metering mechanism 152 may be provided in hopper 110. In other embodiments, such as the embodiments shown in FIGS. 3 and 4, metering mechanism 152 may be provided within conduit 120. In these embodiments, metering mechanism 152 may also include a conveying mechanism so that metering mechanism 152 both measures a quantity of bulk product 108 and moves that quantity and only that quantity toward dispensing opening 118.

A first example of metering mechanism 152 is shown in FIG. 3. In this embodiment, metering mechanism 152 includes a segmented wheel associated with a rod 150. Segmented wheel contains various chambers, shown as four chambers in this embodiment: first chamber 154, second chamber 156, third chamber 158, and fourth chamber 160. In other embodiments, more or fewer chambers may be provided. Each chamber 154, 156, 158, and 160 may define a specific volume so that a specific quantity of bulk product 108 may be inserted into any chamber 154, 156, 158, and 160. For example, chambers 154, 156, 158, and 160 may be sized and shaped to hold three and only three golf balls.

Rod 150 may extend outside of base 112 to a knob 119 (shown in FIG. 2). Knob 119 may be configured so that when a user turns knob 119, rod 150 also rotates, carrying the segmented wheel along with the rotation. As segmented wheel moves, different chambers are exposed to aperture 148. In FIG. 3, third chamber 158 is exposed to aperture 148. As each chamber is exposed to aperture 148, that chamber is filled with bulk product 108. When knob 119 is turned further, the filled chamber is exposed to dispensing opening 118, and bulk product 108 is passed from the filled chamber to dispensing opening 118 so that bulk product 108 may be dispensed into container 116. In FIG. 3, first chamber 154 is exposed to dispensing opening 118, and bulk product 108 is moving from first chamber 154 to dispensing opening 118.

Container 116 may be any type of container capable of holding a quantity of bulk product 108. In some embodiments, container 116 may be a disposable container, such as a plastic bag, a cardboard receptacle, or the like. In some embodiments, the cardboard receptacle may include post-consumer content, such as recycled paper or even recycled bulk product 108. For example, in some embodiments, bulk product 108 may include golf balls. Golf balls may be constructed using a number of materials, including but not limited to natural and synthetic rubber, ionomers, thermoset materials, and thermoplastic materials. Recycling golf balls often includes removing the cover of the golf ball from the core or other internal layers for separate recycling. One example of such a process is described in U.S. Pat. No. 5,976,430, the disclosure of which is incorporated herein by reference. In the '430 patent, mechanical rotors strip the cover off of a golf ball so that the ionomer cover and the rubber core may be recycled using separate processes. Another method often used in recycling golf balls is to pulverize or grind the materials into a powder. One example of such a process is described in US Patent Publication Number 2003/0148824, the disclosure of which is incorporated herein by reference. The pulverized materials may then be incorporated into container 116, such as using pulverized rubber in cardboard or pulverized ionomer in a recipe for making thin film plastic bags.

In some embodiments, container 116 may be packaging specific to a particular bulk product. For example, as shown in FIG. 1, multiple dispensers may be provided in the same retail location, where each dispenser contains the same general type of bulk product, for example, golf balls. However, each dispenser 100 may contain a different specific type of bulk product, such as a specific make or brand of golf ball, or a product with a specific, individualized SKU (stock-keeping unit). Container 116 may be provided proximate a dispenser 100, where container 116 may include printing or other indicia to reflect the type of bulk product 108 in container 116. For example, container 116 may include brand names, specific product names, technical specifications, or the like. In some embodiments, container 116 may be packaging designed to reduce the amount of material in the packaging. For example, golf balls are typically packaged in rectangular parallelepiped sleeves containing three spherical balls. These sleeves necessarily include empty or dead space due to geometry, as the sleeves are at least as wide as the largest length of the ball. This type of geometrical arrangement requires more material than alternative types of packaging. One example of alternative packaging is described in U.S. Patent Application Publication 2012/0024731, entitled "Open Packaging" published Feb. 2, 2012 and filed on Jul. 30, 2010, the disclosure of which is incorporated herein by reference.

Figure 7:
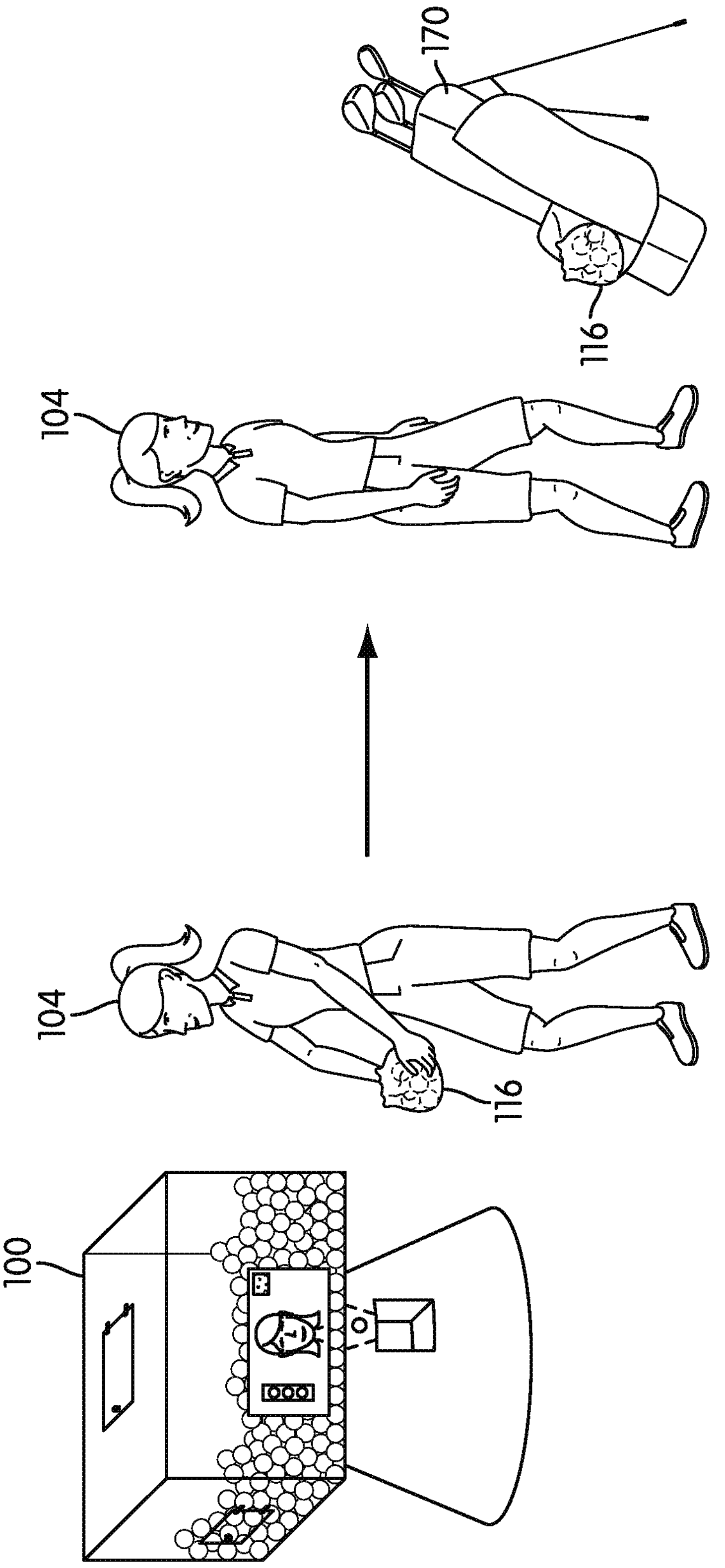
FIG. 7 is a schematic drawing of a user obtaining golf balls from an embodiment of an interactive dispensing system into a container and then fitting that container into a golf bag having a compartment configured to correspond to the container.

Referring to FIG. 7, user 104 is shown using container 116 to collect golf balls as bulk product 108 from an embodiment of an interactive dispensing system 100. In some embodiments, such as the embodiment shown in FIG. 7, container 116 may be configured to be integrated into a carrier 170. This type of arrangement may be particularly useful when bulk product 108 is a replacement part for a system with consumable parts, such as sporting equipment, where other, non-consumable parts of the system may be stored in carrier 170 full-time. In this embodiment, carrier 170 is a golf bag. In other embodiments, carrier 170 may be any other type of carrier, such as a tennis bag, a bat bag, or the like.

Container 116 and carrier 170 may include various elements associating container 116 with carrier 170. In other words, container 116 may be sized, shaped, and/or contain fastening elements that correspond with the size, shape, and/or fastening elements of a pocket or portion of carrier 170. For example, container 116 may be a soft-sided bag with snaps (i.e., either the male or female portion of a complete snap) spaced a certain distance apart. A pocket of carrier 170 may include corresponding snaps (i.e., the other of the male or female portion of a complete snap) spaced the same distance apart so that container 116 may be inserted into the pocket of carrier 170 and secured in position by aligning the snaps on container 116 and the snaps in the pocket of carrier 170 and completing a mechanical connection between the snaps on container 116 and the snaps on carrier 170. In other embodiments, other types of mechanical fasteners may be used, including but not limited to hooks, hook-and-loop connectors, and zippers. In other embodiments, the size and shape of container 116 may be keyed to the size and shape of a pocket on carrier 170. For example, container 116 may be a hard-sided cube of a certain dimension. The pocket on carrier 170 may be a receptacle having the same cubical shape and slightly larger than the certain dimension of container 116.

Interactive system 100 is intended to both dynamically advertise and provide bulk product 108. In some traditional systems, such as gumball machines, the hopper or the base may include a label or signage of some sort advertising or providing information on the bulk product on display, such as brand name, type of bulk product, pricing information, and the like. However, interactive system 100 is intended to provide dynamic information, as opposed to static information. Therefore, interactive system 100 is provided in some embodiments with an interactive display 114, where interactive display is configured to both provide information to user 104 and receive information from user 104.

The information provided to user 104 may include advertising information, including but not limited to technical specifications of bulk product 108, pricing information for bulk product 108, benefits of using bulk product 108, comparisons between various specific types of bulk product 108, and the like. The type of information received by interactive display 114 may include but is not limited to requests for different types of information, inputs regarding desired quantities, inputs regarding selection characteristics, user identification information, and prior purchase information.

Interactive display 114 is configured as an input/output device. As shown in FIG. 2, interactive display 114 may include a screen 117 for visual display, one or more speakers 113 for audio display, and an input device 115. In some embodiments, as shown, screen 117, speaker(s) 113, and input device 115 may be integrated into a single unit. In other embodiments, one or more of these elements may be separate from the other elements. In other embodiments, one or more of these elements may be eliminated from interactive display.

Speaker(s) 113 may be any type of audio display known in the art, including but not limited to electroacoustic transducers, piezoelectric speakers, and magnetostrictive speakers. Speaker(s) 113 may include full range drivers, subwoofers, woofers, mid-range drivers, tweeters, and coaxial drivers. Screen 117 may be any type of visual display screen known in the art. Screen 117 may be a liquid crystal display, a plasma display, a cathode ray tube display, or any other type of display. In some embodiments, screen 117 may have touch screen capabilities so that screen 117 and input device 115 are the same mechanism.

Input device 115 may be any type of input device known in the art. In some embodiments, as discussed above, input device 115 may be screen 117 when screen 117 is a touch screen. In other embodiments, input device 115 may include mechanical or electromechanical devices, such as pushbuttons, dials, and switches. In other embodiments, input device 115 may include a microphone and voice recognition software for voice-driven inputs. In some embodiments, combinations of these different types of input devices may be used.

Generally, interactive display 114 may be operatively associated with the dispensing mechanism of interactive dispensing system 100. In some embodiments, interactive display 114 may include a computer, processor, or central processing unit (not shown) which may send a signal to a motor (not shown) operatively associated with metering mechanism 152. If a user inputs information to dispense bulk product 108, interactive display 114 will transmit a signal to the motor, where the signal actuates the motor, i.e., causes the motor to create motion. The motion created by the motor may be translated to rod 150 using any of a number of known connection/gearing systems so that rod 150 rotates. As described above, the rotation of rod 150 may cause dispense a metered quantity of bulk product 108.

Figure 4:
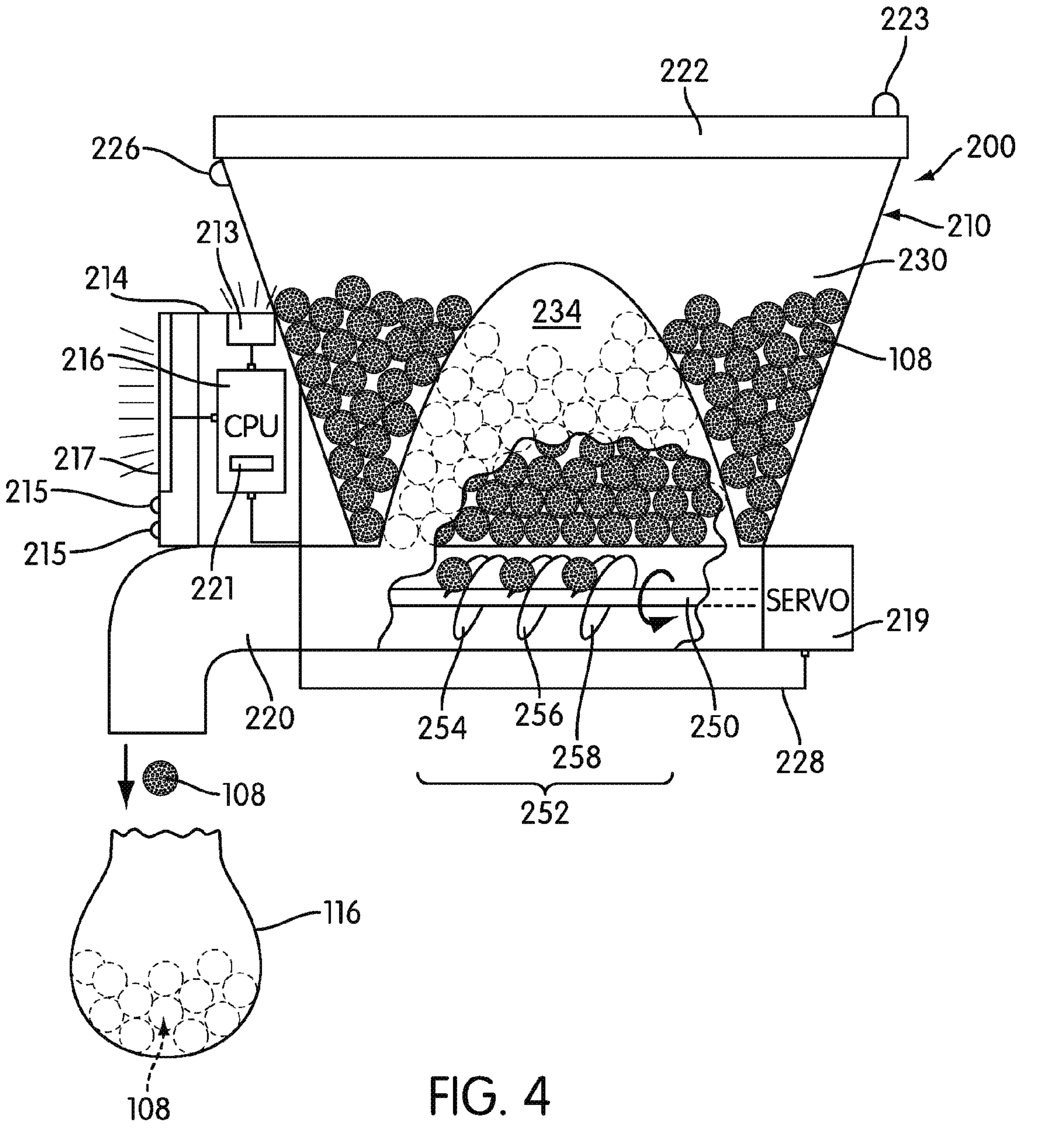
FIG. 4 is an embodiment of an interactive system employing a servo driving a screw.

Another embodiment of a dispensing system 200 is shown in FIG. 4. In this embodiment, no base need be provided. In many respects, however, dispensing system 200 is similar to dispensing system 100. Dispensing system 200 includes a hopper 210 similar to hopper 110 in materials, volume, and construction. As shown in FIG. 4, hopper 210 is generally frustoconical in shape and includes a sidewall 230 and a cover 222. Cover 222 is removably associated with sidewall 230, shown in FIG. 4 to be hingedly attached to sidewall 230 by a hinge 226, which may be any type of hinge known in the art. A handle 223 may be provided to facilitate manipulation of cover 222.

A lower portion of hopper 210 includes an aperture 248 that opens into a conduit 220. Conduit 220 may be integrally formed with hopper 210. However, in the embodiment shown in FIG. 4, conduit 220 is an elongated hollow tube, such as a pipe, and is formed separately and associated with hopper 210, either fixedly or removably. In this embodiment, a metered mechanism 252 includes a threaded portion associated with a rod 250 disposed with in conduit 220. Three screw threads are shown as being helically wound around rod 250: first thread 254, second thread 256, and third thread 258. The spaces between the threads may be sized and shaped to contain a single unit or quantity of bulk product 108. As shown in FIG. 4, these spaces each contain a single golf ball.

One end of rod 252 is operatively associated with a motor, such as servo motor 219. Servo motor 219 is operatively connected to a CPU 216 of an interactive display 214, which is similar in description as interactive display 114 discussed above. The connection between servo motor 219 and CPU 216 may be any connector 228, such as a wire, wireless signal, or the like. If a user inputs a dispensing signal into interactive display via input device 215, CPU 216 transmits a signal to servo motor 219 via connector 228, where the signal actuates servo motor 219. Servo motor 219 rotates rod 250, so that bulk product 108 advances along the length of rod 250 due to the helical shape of threads 254, 256, and 258. Bulk product 108 is pushed toward dispensing opening 218 and into container 116.

Figure 5:
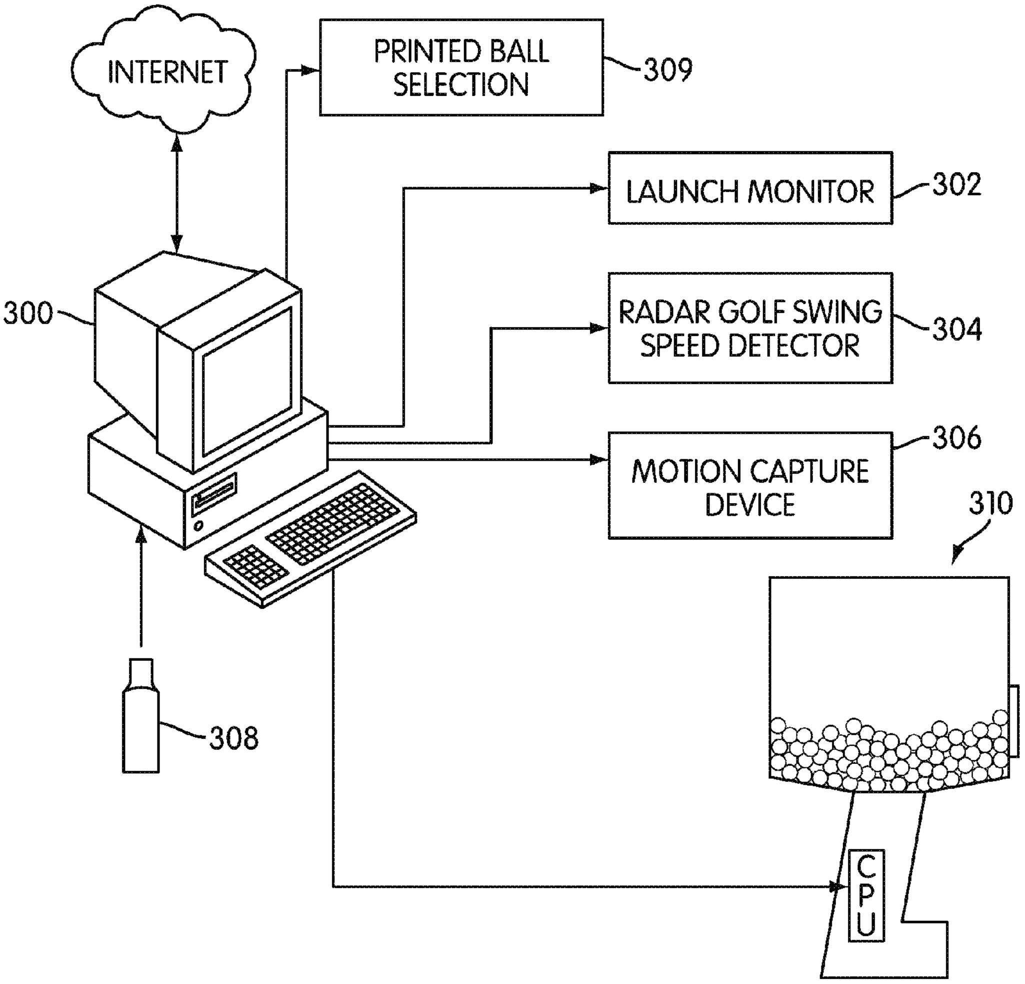
FIG. 5 is a schematic drawing of an embodiment of an interactive dispensing system associated with a ball fitting system.

In some embodiments, interactive display 114, 214 may be configured to receive inputs automatically, i.e., without direct intervention from a user. For example, in some embodiments, interactive dispensing system 100, 200 may contain golf balls. As shown in FIG. 5, the CPU of interactive display 114, 214 may be linked to a ball fitting system, such as the ball fitting system described in U.S. Patent Publication Number 2011/0009215, which is incorporated herein by reference. Using various inputs from sources such as a launch monitor 302, a swing speed detector 304, a motion capture device 306, and information gathered from the golfer, the ball fitting system 300 may select a particular ball for a golfer. The ball selection may be transmitted directly to the CPU of a dispenser, to the dispenser via the Internet. In other embodiments, the ball selection may be provided to a removable electronic memory device 308 such as a flash memory drive, or printed to a card or paper and provided to the user. If not automatically transmitted to the dispenser 100, 200, the user may transfer removable memory device 308 to dispenser 100, 200. When inserted into a slot provided on interactive display 114, 214 such as slot 221 shown in FIG. 4, the ball selection is provided to dispenser 100, 200 and a desired quantity is dispensed.

Figure 6:
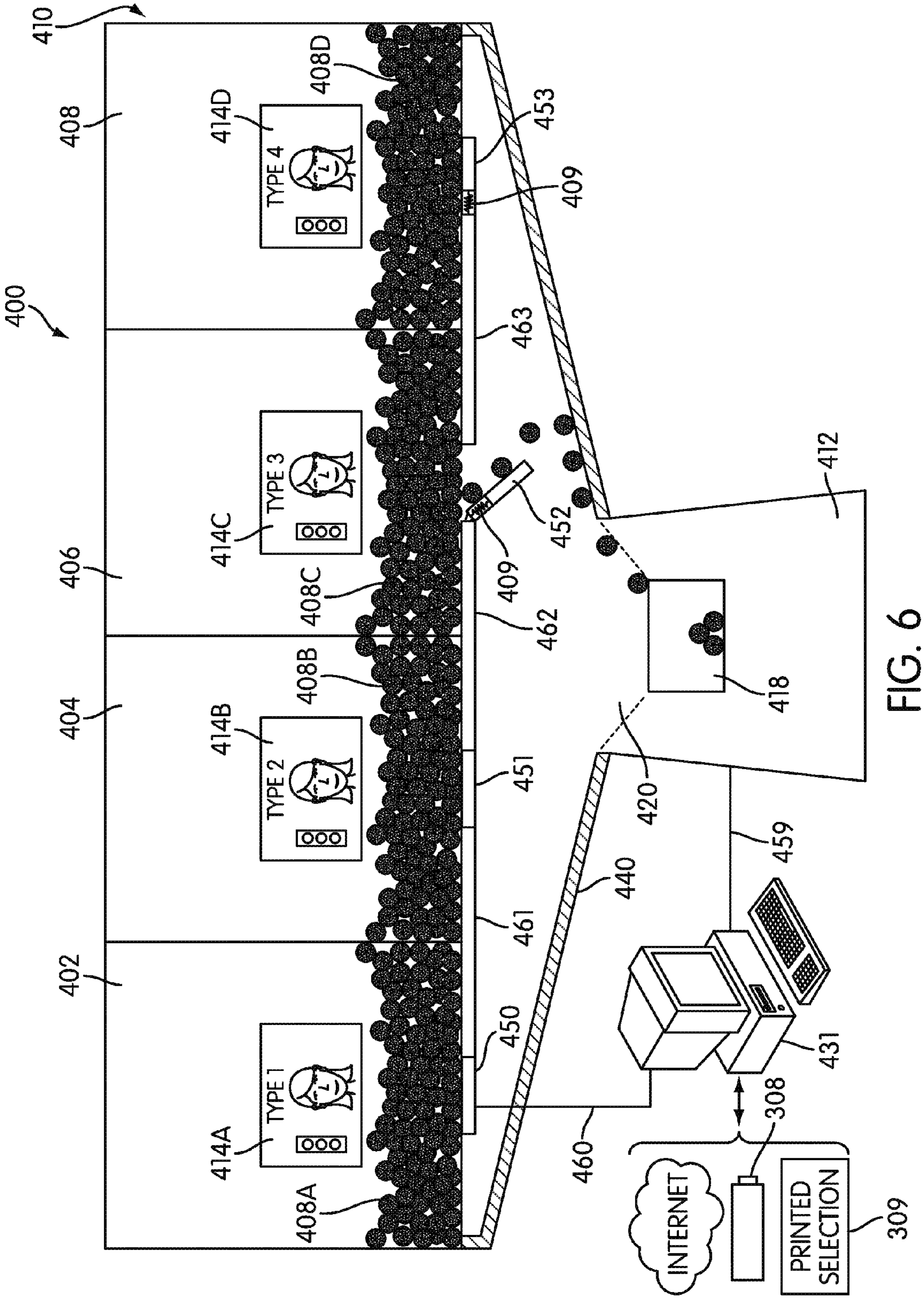
FIG. 6 is a partial cross-sectional view of an embodiment of an interactive dispensing system having multiple compartments and a single dispensing opening.

When using a ball fitting system to provide the input/selection for a particular golf ball, interactive dispensing system 400 as shown in FIG. 6 may be desirably used. In most respects, interactive dispensing system 400 is constructed similarly to interactive dispensing systems 100, 200 discussed above. In this embodiment, hopper 410 may be divided into multiple compartments: first compartment 402, second compartment 404, third compartment 406, and fourth compartment 407 containing first bulk product 408A, second bulk product 408B, third bulk product 408C, and fourth bulk product 408D. While hopper 410 may contain a generic category of bulk product, such as golf balls, each compartment 402, 404, 406, 407 may contain a different specific type of bulk product, for example a specific brand and type of golf ball (an individual SKU, for example.) In some embodiments, hopper 410 may contain bulk product from a specific manufacturer, while each compartment 402, 404, 406, 407 contains a different product in that manufacturer's line. As shown, each compartment 402, 404, 406, and 407 is associated with a different interactive display, respectively 414A, 414B, 4140, and 414D. However, in other embodiments, a single interactive display may be associated with all compartments 402, 404, 406, and 407.

In the embodiment shown in FIG. 6, a single computer 431, which may be any device capable of processing digital information, is operatively connected to doors 450, 451, 452, and 453 which control apertures formed at the bottoms of first compartment 402, second compartment 404, third compartment 406, and fourth compartment 407, respectively. Each door 450, 451, 452, and 453, when opened allowed bulk product to be released from its respective compartment. Doors 450, 451, 452, and 453 may be held in a closed position with a magnetic locking mechanism (not shown), which may be controlled by computer 431. Doors 450, 451, 452, and 453 may also be spring-loaded, such as with springs 409, so that doors 450, 451, 452, and 453 are biased to return to a closed position or held to an open position until magnetic locks engage.

A first connection 460 links computer 431 with first door 450. A second connection 461 extends the link from computer 431 to second door 451. A third connection 462 extends the link from computer 431 to third door 452. A fourth connection 463 extends the link from computer 431 to fourth door 453. Each connection 460, 461, 462, 463 may be any type of connection capable of transmitting signals from computer 431, such as wireless and wireline linkages, which are commonly known. Similar connections may link computer 431 with each display 414A, 414B, 414C, 414D (not shown) so that a user may directly input information to computer 431 by interacting with displays 414A, 414B, 414C, 414D.

Computer 431 may receive an input from a display 414A, 4143, 414C, 414D, or from the Internet, a removable memory unit 308, or directly from a user, such as a user directly inputting information from printed selection card 309. Computer 431 may then send a signal to open one of doors 450, 451, 452, 453 in order to dispense a particular selected product via conduit 420 to dispensing opening 418 in base 412. Other configurations, such as multiple openings, lack of a base, or the like are also contemplated. FIG. 6 shows just one example of a single dispensing unit having multiple types of bulk product available.

FIGS. 8-13 show various examples of screen shots which may appear on an interactive display such as interactive display 114. In these examples, golf balls are used as examples of a bulk product to be dispensed by system 100. However, similar screen shots could be adapted to any number of bulk products.

Figure 8:
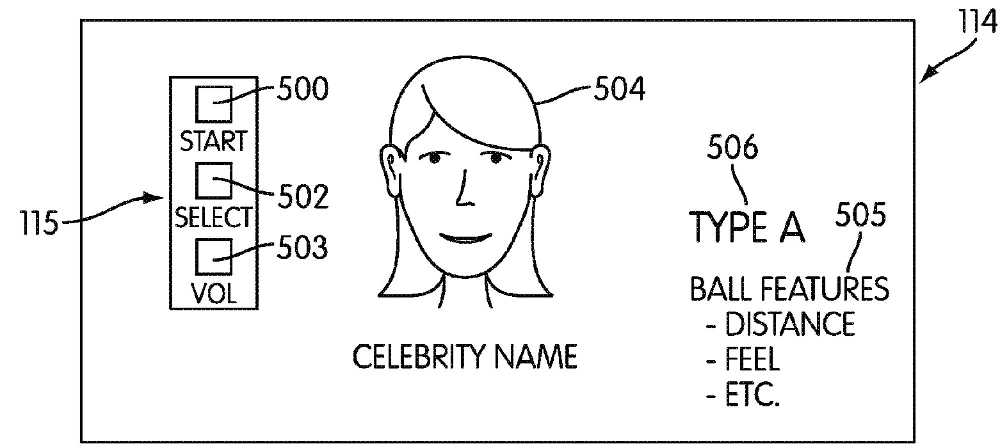
FIG. 8 is a screen shot of an embodiment of an interactive display where a spokesperson is describing the attributes of the bulk product.

FIG. 8 shows an example of an advertising screen. A graphical representation 506 is used to identify the product, such as by manufacturer, brand name, trademark, colloquial name, etc. A spokesperson, such as a model, actor, athlete, celebrity, or everyday user, may be graphically represented, such as with an image or icon 504. In other embodiments, other types of icons 504 may be used, such as animated characters, static objects, or the like. Icon 504 may present the user with audio information, including but not limited to specifications on the contents or construction of a particular available product (such as technical specifications, nutrition information, etc.), reasons to purchase the particular available product, performance characteristics of the products, and other types of information. This information may also be provided graphically in features list 505, so that hearing impaired users or other users who prefer to read the information may also be given the information. Buttons 115 may include a start button 500 for initiating the information delivery, a select button 502 for choosing a menu item or a product or other choice presented to a user, and a volume control button 503.

Figure 9:
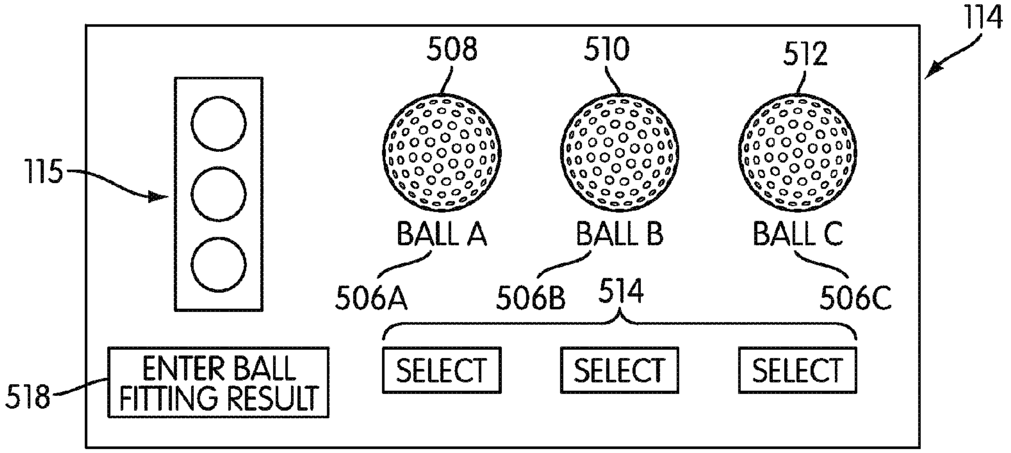
FIG. 9 is a screen shot of an embodiment of an interactive display where multiple types of a bulk product are presented for selection.

If multiple types of bulk products are offered, FIG. 9 shows a possible screen shot presenting the user with various selection possibilities: a first golf ball 508, a second golf ball 510, and a third golf ball 512. Each golf ball choice may be graphically represented with a different icon on display 114. Additionally, each golf ball choice may be identified with by an alphanumeric graphic label, such as a tradename, like first label 506A, second label 506B, and third label 506C. A selection button 514 may be associated with each choice. Selection button 514 may be separate from the icons or, on a touch screen, may be the icons. Instructions for selecting and/or otherwise operating the dispenser may also be provided, either graphically or via an audio performance. An options button 518 may be provided to allow a user to provide or request information from the system. In the embodiment shown in FIG. 9, options button 518 directs the user to a screen for inputting information from a ball fitting system (not shown).

Figure 10:
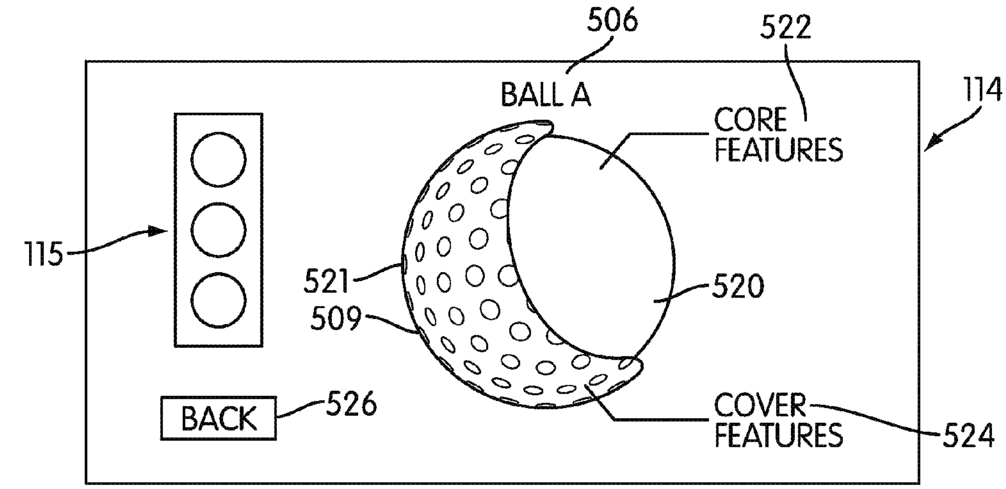
FIG. 10 is a screen shot of an embodiment of an interactive display where a specific type of a bulk product is described to the user.

FIG. 10 shows an embodiment of a screen displaying technical information about a selection choice. An alphanumeric graphic label 506 shows which bulk product is being described. A second alphanumeric graphic label 522 describes a first set of features, as related to an enlarged icon 509 of the bulk product, in this example a golf ball. A third alphanumeric graphic label 524 describes a second set of features. Icon 509 is a cutaway view of a golf ball showing the interior technology of a core 520 and a cover 521. Such information may be interesting to golfers and influence their purchasing decisions. In other embodiments, other types of informational icons may be used, such as cutaway views of candy, enlarged views of objects with small surface features, or the like, depending upon the types of information anticipated to be used by a purchaser in making a purchasing decision.

Figure 11:
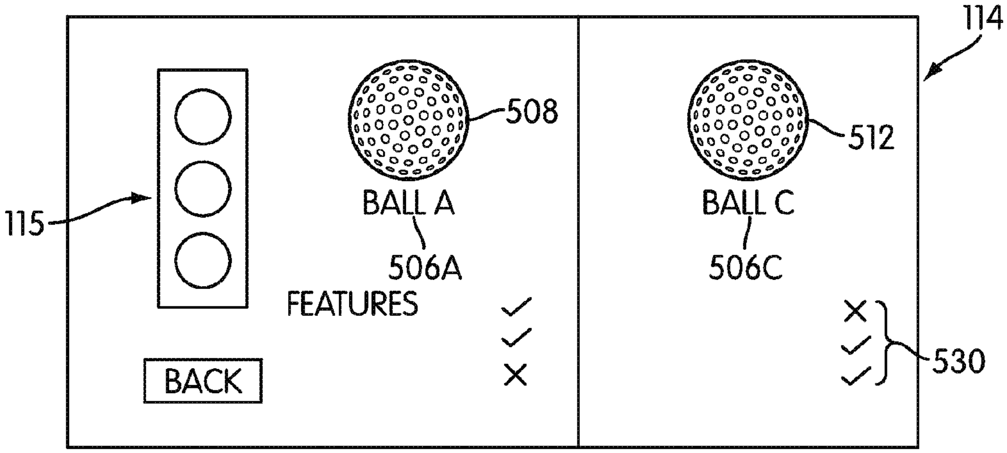
FIG. 11 is a screen shot of an embodiment of an interactive display where various attributes of two types of the bulk product are presented for comparison.

FIG. 11 shows a screen where two similar products are compared side-by-side to facilitate purchasing decisions. A first selection 508 and a second selection 512 may be graphically represented with icons and/or alphanumeric labels 506A, 506B. A list of comparison features 530 may be presented, with a graphical representation or chart showing which selection includes which features. The list of features may be adjustable by the user. The list of comparison features may include available quantities, pricing, technical specifications, performance characteristics, positive or negative user feedback, or any other type of comparison feature a user may find interesting or helpful in making a purchasing decision.

Figure 12:
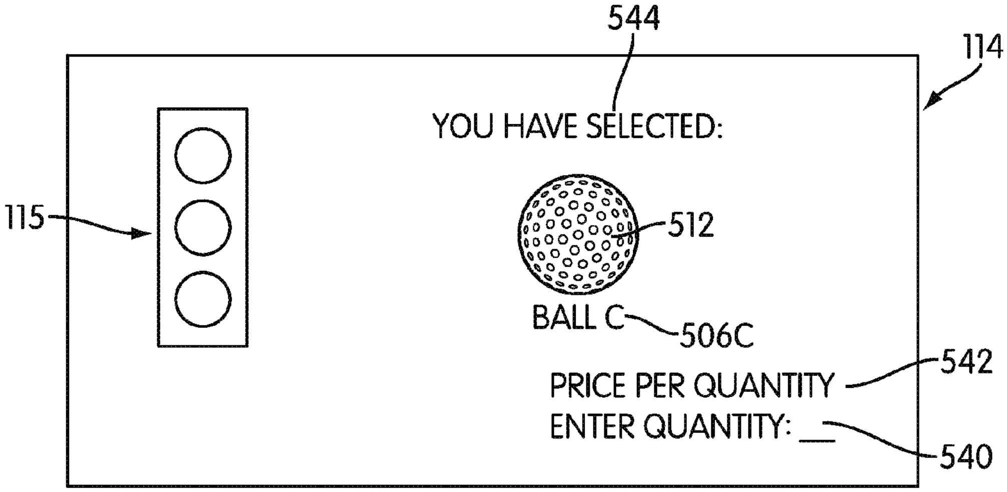
FIG. 12 is a screen shot of an embodiment of an interactive display where a specific type of a bulk product has been selected and the user is prompted to enter quantities for dispensing.
Figure 13:
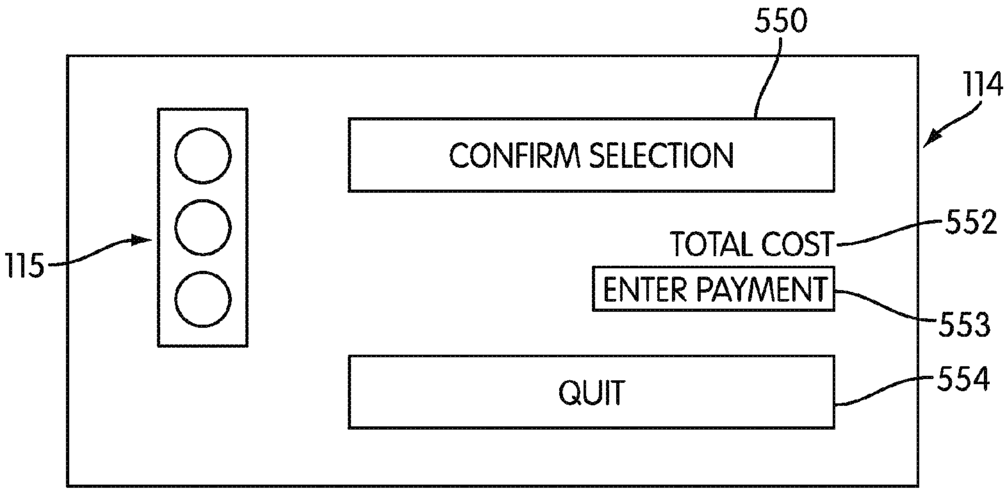
FIG. 13 is a screen shot of an embodiment of an interactive display where a user is prompted to confirm a selection of a type of bulk product and/or enter payment.

FIGS. 12 and 13 show embodiments of screens for finalizing a selection of a particular bulk product. FIG. 12 shows a selection screen with a fourth alphanumeric graphic 544 providing a headline that a selection has been made. Icon 512 and label 506C are used to describe the selected bulk product, in this embodiment a golf ball. A fifth alphanumeric graphic 540 provides an input prompt for a user to enter a quantity of bulk product to purchase. A minimum amount may be required, or any amount may be inputted using any of the input mechanisms described herein.

FIG. 13 shows a screen shot which may optionally show a final confirmation screen. A sixth alphanumeric graphic 550 may request the input of the user to specifically confirm the selection prior to dispensing. A seventh alphanumeric graphic 552 may display to the user a total cost, given the quantity inputted in an earlier screen, such as the screen shown in FIG. 12. An eighth alphanumeric graphic 553 may prompt a user to enter payment, such as via a credit card, or a money inserting slot such as is commonly used on vending machines for accepting paper and coin currency. A ninth alphanumeric graphic 554 may prompt a user to exit the transaction should the user have changed his or her mind regarding the purchase.

Figure 14:
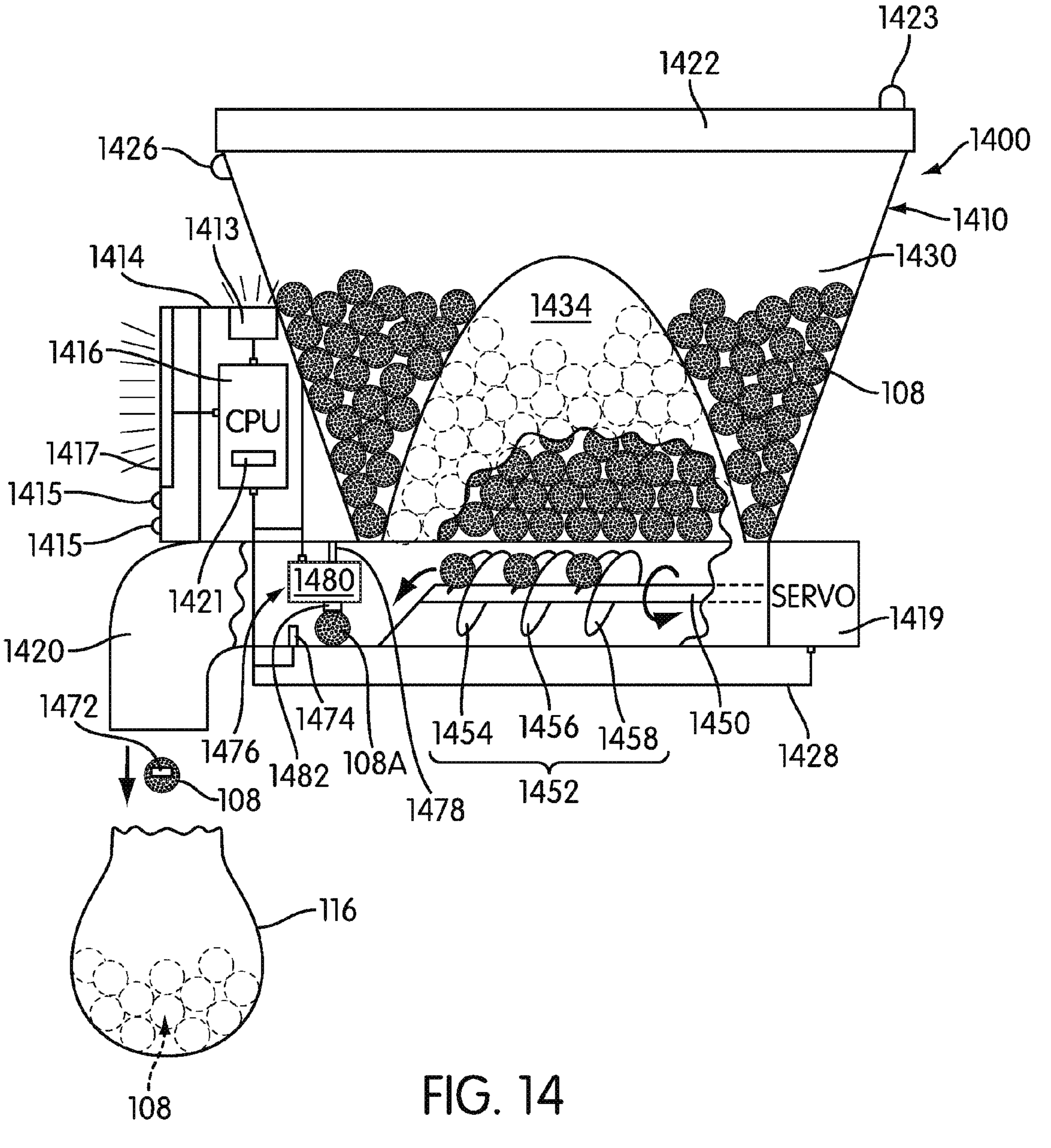
FIG. 14 is an embodiment of an interactive system for dispensing system configured to allow for customization of the bulk product.

In some embodiments, a user may wish to customize the selected golf balls 108. In some embodiments, that customization may entail printing onto the surface of a selected golf ball, such as printing golf ball 108A as shown in FIG. 14. The printing interactive dispensing system 1400 shown in FIG. 14 is similar to interactive dispensing system 100 and alternative interactive dispensing system 200, discussed above. Similar elements between these various systems include hopper 1410 having various side walls such as first side wall 1430 and third side wall 1434, which are similar to first side wall 130 and third side wall 134, discussed above. Hopper 1410 may also include a top door 1422 hingedly attached to the side walls of hopper 1410 via a first hinge 1426, similar to first door 122 and first hinge 126, discussed above. Hopper 1410 may also include an interactive display 1414, similar to interactive display 114, with such elements as a central processing unit (CPU) 1416, similar to CPU 116, an optional speaker 1413, similar to speaker 113, optional buttons 1415, similar to buttons 115, an optional screen 1417, similar to screen 117, and an optional input slot 1421, similar to input slot 121.

Printing interactive system 1400 may include a dispensing conduit 1420, similar to conduit 120. Dispensing conduit 1420 may include a metered conveyor 1452, similar to metered conveyor 152, that includes a rod 1450, similar to rod 250. Rod 1450 may include several metered chambers or threads, such as first thread 1454, second thread 1456, third thread 1458, which are all similar to the metered chambers and threads discussed above, such as first metered chamber 154, second metered chamber 156, and third metered chamber 158, first thread 254, second thread 256, and third thread 258.

Dispensing conduit 1420 may include a printer 1476. Printer 1476 may be any device capable of transferring an indicia 1472 to the articles in hopper 1410. In some embodiments, indicia 1472 may include a logo, alphanumeric characters, or graphics, though in other embodiments, other types of indicia may be provided.

In some embodiments, printer 1476 may be an ink or paint dispenser and/or applicator. In such embodiments, printer 1476 may include a compartment 1480. Compartment 1480 may be a chamber or housing configured to contain the medium to be transferred to the articles in hopper 1410. In some embodiments, the medium may include, but is not limited to, ink, paint, decals, and films. Compartment 1480 may also include electronics configured to control the application of the medium to the articles in hopper 1410. Compartment 1480 may be associated with CPU 1416. A user may input customizing information into interactive display 1414, which may be stored or entered into CPU 1416 and is then transferred to compartment 1480 via the association between CPU 1416 and compartment 1480. The association between CPU 1416 and compartment 1480 may be wireline or wireless or any other type of information-transferring association.

In some embodiments, printer 1476 may be positioned within conduit 1420. As shown in FIG. 14, printer 1476 is positioned within conduit 1420 between metered conveyor 1452 and the outlet feeding into container 116. In this embodiment, compartment 1480 is attached to an inner surface of conduit 1420 by mount 1478. Depending upon which type of printer is provided, mount 1478 may be a static or a dynamic device. In those embodiments where mount 1478 is a static device, mount 1478 may include, but is not limited to, a rod, a pin, a mechanical connector such as a screw, snap, or other similar connector, a post, combinations of these devices, or the like. In those embodiments where mount 1478 is a dynamic device, mount 1478 may include, but is not limited to, a hydraulic-, a pneumatic-, a servo-driven piston or rod, or combinations of these devices.

In some embodiments, printer 1476 includes a transfer device 1482. Transfer device 1482 may be any device capable of transferring the medium within compartment 1480 to the article within hopper 1410. In some embodiments, transfer device 1482 may include a printing pad, stamp, or decal applicator. In such embodiments, mount 1478 is most likely a dynamic device configured to move compartment 1480 and/or transfer device 1482 towards and away from the printing article 108A, which is positioned proximate printer 1476 and transfer device 1482.

In some embodiments, transfer device 1482 may include a printer head. In such embodiments, mount 1478 is most likely a static device configured to hold compartment 1480 and/or transfer device 1482 steady while the printing article 108A is positioned proximate printer 1476 and/or transfer device 1482. In some such embodiments, printer 1476 may be any type of printer known in the art, such as an inkjet printer, a laser printer, or a dot matrix printer.

In some embodiments, a stop 1474 may be associated with an interior surface of conduit 1420 to prevent printing article 108A from moving past printer 1476 before the transfer of indicia 1472. In some embodiments, stop 1474 may be a hinged or retractable flange extending into the interior space defined by conduit 1420. Stop 1474 may be controlled by CPU 1416 and/or compartment 1480. Stop 1474 may be configured to be actuated to extend into the interior space defined by conduit 1420 and then flatten against an interior surface of conduit 1420 and/or retract into a sidewall of conduit 1420 to allow printing article 108A to move along conduit 1420 and into container 116. An optional dryer (not shown), such as a heater, an air blower, a light configured to dry or cure the medium, may be provided to ensure that indicia 1472 is sufficiently dried/cured to avoid smudging or smearing as article 108A advances into container 116 or is stored in container 116.

A user may input an indicia into interactive display 1414 using any method known in the art, such as keyboarding, scanning, uploading from a portable drive or card, or speaking into a microphone in embodiments where CPU 1416 is provided with voice recognition software. In some embodiments, interactive display 1414 may be provided with a camera for taking photographs, including, but not limited to photographs of people, items, graphics, logos, alphanumeric characters, and combinations of these features. Indicia may be stored in CPU 1416 using any kind of memory known in the art, such as flash memory, RAM, or ROM. The user may elect to customize all of the selected articles, a portion of the selected articles, or only one of the selected articles. Similarly, a user may provide more than one indicia, so that more than one indicia is transferred to each of the selected articles, or that only one of the indicia is transferred to each of the selected articles, but different articles may be provided with different indicia.

After a user inputs the desired indicia into interactive display 1414, indicia 1472 is transmitted to printer 1476. As each article, such as golf balls 108, advance to a position proximate printer 1476, each article becomes printing article 108A in turn. When printing article 108A is positioned proximate printer 1476, printing article 108A is brought into contact with transfer device 1482. Printer 1476 then directs transfer device 1482 to transfer indicia 1472 onto printing article 108A. Article 108 then advances through conduit 1420 and into container 116.

As will be apparent to those in the art, the alphanumeric graphics providing messages to users and/or prompting the user to input information may themselves be a touch screen button allowing the user to input the requested information.

Any of the electronic systems described herein may be programmed to perform the desired functions using any of a number of known algorithms, computer programming languages, off the shelf software, or the like.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims. Further, any element of any embodiment may be used in any other embodiment described herein, unless specifically limited in the specification to prohibit such adaptations as should be apparent to those of skill in the art.

What is claimed is:

1. A system for dispensing golf balls, the system comprising:

a hopper configured to contain a plurality of types of the golf balls;

an interactive display associated with the hopper configured to facilitate a selection of a quantity of the golf balls; and a ball fitting system for inputting information for selecting one type of the golf balls, wherein the hopper is configured to dispense the quantity of the one type of the golf balls.

2. The system according to claim 1, wherein the interactive display includes a visual display and an input mechanism, wherein the input mechanism is configured to allow the user to control at least one aspect of the visual display.

3. The system according to claim 1, wherein the interactive display includes a central processing unit.

4. The system according to claim 1, wherein the hopper is operatively associated with a metered conveyor, wherein the metered conveyor is configured to dispense a preselected quantity of the golf balls.

5. The system according to claim 1, wherein the hopper is divided into a first compartment containing a first type of golf ball and a second compartment containing a second type of golf ball, and wherein each of the first type of golf ball, and the second type of golf ball is a candidate ball for the particular type of golf ball.

6. A system for dispensing golf balls, the system comprising:

a hopper configured to contain the golf balls;

an interactive display associated with the hopper configured to facilitate a selection of a quantity of the golf balls, including an input mechanism for inputting a desired customization for the quantity of the golf balls; and a dispensing between the hopper and a dispensing opening for dispensing the quantity of the golf balls, wherein the dispensing conduit comprises a printer for customizing the quantity of the golf balls with indicia.

7. The system according to claim 6, wherein the input mechanism comprises at least one of a button, a touch screen, and a voice input.

8. An interactive dispensing system for dispensing golf balls, the interactive dispensing system comprising:

a hopper configured to contain the golf balls;

a base associated with the hopper;

a dispensing opening disposed in the base;

a conduit associating the hopper with the dispensing opening;

a metered conveyor disposed in the conduit, wherein the metered conveyor separates the hopper from the dispensing opening; and an input/output device operatively associated with the metered conveyor, wherein the input/output device is configured to provide information to a user, wherein the interactive dispensing system comprises a printer for customizing at least a portion of the golf balls and wherein the input/output device is configure to receive an instruction from the user.

9. The interactive dispensing system of claim 8, wherein the instruction from the user instructs the metered conveyor to move in order to dispense the golf balls.

10. The interactive dispensing system of claim 8, wherein the metered conveyor comprises at least one of a segmented wheel and a threaded screw.

11. The interactive dispensing system of claim 8, wherein the metered conveyor is driven by a motor operatively associated with the metered conveyor and the input/output device.

* * * * *

UNITED STATES PATENT AND TRADEMARK OFFICE

CERTIFICATE OF CORRECTION

PATENT NO. : 8,781,623 B2
APPLICATION NO. : 13/405674
DATED : July 15, 2014
INVENTOR(S) : Nicholas A. Leech, Darek A. Fitchett and Jung Gyu Moon It is certified that error appears in the above-identified patent and that said Letters Patent is hereby corrected as shown below:

In the Claims

Column 14, line 28, line should be changed to "a dispensing conduit between the hopper and a dispensing opening".

Signed and Sealed this
Nineteenth Day of May, 2015

Michelle K. Lee
*Director of the United States Patent and Trademark Office*